United States Patent
Hong et al.

(10) Patent No.: US 12,032,082 B2
(45) Date of Patent: Jul. 9, 2024

(54) APPARATUS FOR ESTIMATING POSITION OF RECEIVER AND METHOD THEREOF

(71) Applicant: UNIVERSITY-INDUSTRY COOPERATION GROUP OF KYUNG HEE UNIVERSITY, Yongin-si (KR)

(72) Inventors: Een Kee Hong, Seongnam-si (KR); Eung Hyo Kim, Daejeon (KR); Je Woo Lee, Suwon-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 316 days.

(21) Appl. No.: 17/597,154

(22) PCT Filed: Nov. 12, 2019

(86) PCT No.: PCT/KR2019/015333
§ 371 (c)(1),
(2) Date: Dec. 28, 2021

(87) PCT Pub. No.: WO2020/262770
PCT Pub. Date: Dec. 30, 2020

(65) Prior Publication Data
US 2022/0308154 A1  Sep. 29, 2022

(30) Foreign Application Priority Data

Jun. 28, 2019 (KR) .................. 10-2019-0078294
Sep. 27, 2019 (KR) .................. 10-2019-0119711

(51) Int. Cl.
*G01S 5/02* (2010.01)

(52) U.S. Cl.
CPC ................. *G01S 5/0246* (2020.05)

(58) Field of Classification Search
CPC ..... H04W 16/28; H04W 4/029; H04W 64/00; H04W 4/023; H04W 92/18;
(Continued)

(56) References Cited

U.S. PATENT DOCUMENTS

| 2015/0130661 | A1  | 5/2015 | Desclos et al. |
| 2015/0133173 | A1* | 5/2015 | Edge ........................ G01S 5/08 |
|              |     |        | 455/456.6 |
| 2017/0029107 | A1* | 2/2017 | Emami ................. G08G 5/0069 |

FOREIGN PATENT DOCUMENTS

| JP | 2001-251233 A | 9/2001 |
| JP | 2018-011150 A | 1/2018 |

(Continued)

OTHER PUBLICATIONS

International Search Report for PCT/KR2019/015333 dated Mar. 24, 2020 (PCT/ISA/210).

*Primary Examiner* — Kwasi Karikari
(74) *Attorney, Agent, or Firm* — Sughrue Mion, PLLC (57) ABSTRACT

The present invention relates to an apparatus for estimating the location of a receiver and a method of estimating the location of a receiver. A location estimation apparatus according to one embodiment includes a receiving device for receiving information about a plurality of beams radiated from a transmitter at different radiation angles; a radiation pattern reader for reading radiation pattern information corresponding to each of the beams based on information about the beams; and a location estimator for comparing the read radiation pattern information with each other and estimating the location of a receiver based on the comparison result.

10 Claims, 6 Drawing Sheets

(58) Field of Classification Search
CPC . H04W 64/003; H04W 4/025; H04W 56/001; H04W 72/542; H04W 4/026; H04W 12/63; H04W 52/367; H04W 36/32
See application file for complete search history.

(56) References Cited

FOREIGN PATENT DOCUMENTS

| | | |
|---|---|---|
| KR | 10-2008-0104985 A | 12/2008 |
| KR | 10-1529979 B1 | 6/2015 |

* cited by examiner

APPARATUS FOR ESTIMATING POSITION OF RECEIVER AND METHOD THEREOF

CROSS REFERENCE TO RELATED APPLICATIONS

This application is a National Stage Entry of PCT International Application No. PCT/KR2019/015333, which was filed on Nov. 12, 2019, and claims priority to Korean Patent Application No. 10-2019-0078294, filed on Jun. 28, 2019, and Korean Patent Application No. 10-2019-0119711, filed on Sep. 27, 2019, in the Korean Intellectual Property Office, the disclosures of each of which are incorporated herein by reference.

TECHNICAL FIELD

The present invention relates to an apparatus for estimating the location of a receiver and a method of estimating the location of a receiver, and more particularly, to a technical idea of estimating the location of a receiver using radiation pattern information of beams radiated from a transmitter.

This work was supported by Institute for Information & communications Technology Planning & Evaluation (IITP) grant funded by the Korea government (MSIT) (No. 2021-0-02046-001, 6H next-generation mobile communication technology development).

The national research and development projects related to this application are as follows.

Project unique number: 1711139229, Project number: 2021-0-02046-001, Government department: Ministry of Science and ICT, R&D management Agency: Institute for Information & communications Technology Planning & Evaluation, R&D project: (Innovation law) Information and Communication Technology Manpower Training/University ICT Research Center Support, Research Project Title: 6H Next-Generation Mobile Communication Technology Development, Contribution Ratio: 1/1, Managing department: Industry-University Cooperation Foundation, Kyung Hee University, Project period: Jul. 1, 2021~Dec. 31, 2028.

BACKGROUND ART

To transmit a signal using the beamforming technique, it is necessary to estimate the location of a receiver.

Accordingly, in the existing location estimation technology, a beam management method, which is 5G technology, is used.

Specifically, according to the beam management method, a base station sets a beam interval and transmits beams sequentially at specific angles, a receiver reports reference signal received power (RSRP) information received for each angle, and then the base station transmits the beam at the angle with the largest RSRP value.

In addition to the above-described beam management method, to improve the accuracy of location estimation, a method of sequentially transmitting beams at predetermined angles, reporting RSRP information by a receiver, and then transmitting beams corresponding to two angles having a large RSRP value by using the RSRP value as a weighting factor has been proposed.

However, in the case of a method of transmitting a beam at an angle having the largest RSRP value, since an error in estimating the location of a receiver is large, it is difficult to accurately estimate the location of the receiver. In the case of a method using a weighting factor, since a radiation pattern transmitted through an antenna is not considered, there is a problem in that a location cannot be accurately estimated. Therefore, it is necessary to devise a more accurate method than the existing location estimation method.

DISCLOSURE

Technical Problem

Therefore, the present invention has been made in view of the above problems, and it is one object of the present invention to provide a location estimation apparatus capable of estimating the location of a receiver by comparing radiation pattern information corresponding to a plurality of beams radiated from a transmitter at different arbitrary radiation angles and a method thereof.

It is another object of the present invention to provide a location estimation apparatus capable of accurately estimating the location of a receiver using only two beams radiated from a transmitter at different arbitrary radiation angles and a method thereof.

It is yet another object of the present invention to provide a location estimation apparatus capable of quickly performing location estimation and reducing complexity of location estimation by estimating the location of a receiver in all directions based on the location of a transmitter by transmitting only two beams and comparing received values for the two beams and a method thereof.

Technical Solution

In accordance with one aspect of the present invention, provided is a location estimation apparatus including a receiving device for receiving information about a plurality of beams radiated from a transmitter at different radiation angles; a radiation pattern reader for reading radiation pattern information corresponding to each of the beams based on information about the beams; and a location estimator for comparing the read radiation pattern information with each other and estimating a location of a receiver based on the comparison result.

According to one aspect, the information about the beams may include a radiation angle of each of the beams and a received power value of the receiver corresponding to each of the beams.

According to one aspect, the radiation pattern reader may pre-store radiation pattern information corresponding to each of m beams (m being a positive integer) radiated from the transmitter at different radiation angles and read radiation pattern information corresponding to information about the beams among the pre-stored radiation pattern information.

According to one aspect, the location estimator may calculate an antenna gain corresponding to each of the read radiation pattern information, subtract each of decibel (dB) values of the calculated antenna gains from each other, calculate an angle corresponding to a result value having a preset value among all result values according to the subtraction results, and estimate an angle corresponding to the calculated result value as an angle between the transmitter and the receiver.

According to one aspect, when a plurality of result values having the preset value is calculated according to subtraction of each of decibel (dB) values of antenna gains corresponding to first and second beams, the location estimator may calculate any one value corresponding to each subtraction result between decibel (dB) values of antenna gains of the first and second beams and a decibel (dB) value of an antenna gain of a third beam among the calculated result values and estimate an angle corresponding to the calculated value as an angle between the transmitter and the receiver.

According to one aspect, the location estimator may estimate an angle between the transmitter and the receiver based on a value at which a result of subtracting a value obtained by reflecting a decibel (dB) value of an antenna gain corresponding to a first beam to a received power value corresponding to a second beam from a value obtained by reflecting a decibel (dB) value of an antenna gain corresponding to the second beam to a received power value corresponding to the first beam is minimum.

According to one aspect, the radiation pattern reader may calculate two beams having the largest received power value among the beams and read radiation pattern information corresponding to each of the calculated two beams.

According to one aspect, when radiation angles of the calculated two beams are $\theta_1$ and $\theta_2$ ($\theta_1 < \theta_2$), respectively, the location estimator may estimate a location of the receiver within a radiation angle range of $\theta_1 - \alpha$ to $\theta_2 + \alpha$ ($\alpha$ being an interval between the calculated two beams).

In accordance with another aspect of the present invention, provided is a location estimation method including a step of receiving, by a receiving device, information about a plurality of beams radiated from a transmitter at different radiation angles; a step of reading, by a radiation pattern reader, radiation pattern information corresponding to each of the beams based on information about the beams; and a step of comparing, by a location estimator, the read radiation pattern information with each other and estimating a location of a receiver based on the comparison result.

According to one aspect, the information about the beams may include a radiation angle of each of the beams and a received power value of the receiver corresponding to each of the beams.

According to one aspect, in the step of estimating a location of a receiver, an antenna gain corresponding to each of the read radiation pattern information may be calculated, each of decibel (dB) values of the calculated antenna gains may be subtracted from each other, an angle corresponding to a result value having a preset value among all result values according to the subtraction results may be calculated, and an angle corresponding to the calculated result value may be estimated as an angle between the transmitter and the receiver.

According to one aspect, in the step of reading radiation pattern information, two beams having the largest received power value among the beams may be calculated, and radiation pattern information corresponding to each of the calculated two beams may be read.

Advantageous Effects

According to one embodiment, by comparing radiation pattern information corresponding to a plurality of beams radiated from a transmitter at different arbitrary radiation angles, the location of a receiver can be estimated.

According to one embodiment, by using only two beams radiated from a transmitter at different arbitrary radiation angles, the location of a receiver can be accurately estimated.

According to one embodiment, by estimating the location of a receiver in all directions based on the location of a transmitter by transmitting only two beams and comparing received values for the two beams, complexity of location estimation can be reduced, and location estimation can be performed quickly.

BEST MODE

Specific structural and functional descriptions of embodiments according to the concept of the present invention disclosed herein are merely illustrative for the purpose of explaining the embodiments according to the concept of the present invention. Furthermore, the embodiments according to the concept of the present invention can be implemented in various forms and the present invention is not limited to the embodiments described herein.

The embodiments according to the concept of the present invention may be implemented in various forms as various modifications may be made. The embodiments will be described in detail herein with reference to the drawings. However, it should be understood that the present invention is not limited to the embodiments according to the concept of the present invention, but includes changes, equivalents, or alternatives falling within the spirit and scope of the present invention.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present invention.

It should be understood that when an element is referred to as being "connected to" or "coupled to" another element, the element may be directly connected or coupled to the other element or intervening elements may be present. In contrast, when an element is referred to as being "directly connected to" or "directly coupled to" another element, there are no intervening elements present. Other words used to describe the relationship between elements or layers should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings. However, the scope of the present invention is not limited by these embodiments. Like reference numerals in the drawings denote like elements.

Figure 1:
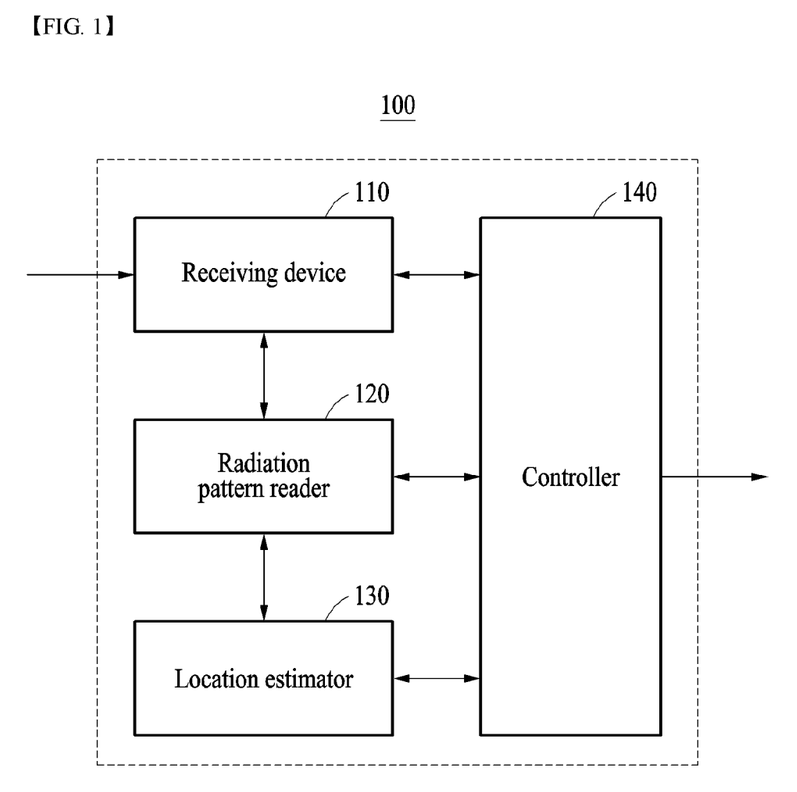
FIG. 1 is a block diagram for explaining a location estimation apparatus according to one embodiment.

FIG. 1 is a block diagram for explaining a location estimation apparatus according to one embodiment.

Referring to FIG. 1, a location estimation apparatus 100 according to one embodiment may estimate the location of a receiver by comparing radiation pattern information corresponding to a plurality of beams radiated from a transmitter at different arbitrary radiation angles.

In addition, the location estimation apparatus 100 may estimate the location of a receiver more accurately using only two beams radiated from a transmitter at different arbitrary radiation angles.

In addition, the location estimation apparatus 100 may reduce complexity of location estimation and perform location estimation quickly by estimating the location of a receiver in all directions based on the location of a transmitter by transmitting only two beams and comparing received values for the two beams.

For this function, the location estimation apparatus 100 may include a receiving device 110, a radiation pattern reader 120, and a location estimator 130.

In addition, the location estimation apparatus 100 may further include a controller 140 for controlling operation of the receiving device 110, the radiation pattern reader 120, and the location estimator 130.

According to one aspect, the controller 140 may generate a control signal for controlling a transmitter to radiate a plurality of beams and transmit the generated control signal to the transmitter.

For example, the location estimation apparatus 100 may be applied to a signal transmission system or a wireless power transmission system using beamforming, and may be implemented as a location estimation algorithm for estimating the location of a receiver.

In addition, the location estimation apparatus 100 may be provided in a transmitter or may be implemented as a separate apparatus independent of the transmitter.

"Angle" described below may be interpreted as an angle formed from a virtual reference line set in an arbitrary direction from the location of a transmitter.

For example, "radiation angle" described below may be interpreted as an angle formed between a beam radiated from a transmitter and a virtual reference line, and "angle between a transmitter and a receiver" may be interpreted as an angle formed between a straight line connecting the location of a transmitter and the location of a receiver and a virtual reference line.

Specifically, the receiving device 110 according to one embodiment may receive information about a plurality of beams radiated from a transmitter at different radiation angles.

That is, the receiving device 110 may receive information about two or more beams (first to n-th beams, wherein n is a positive integer) radiated from a transmitter.

According to one aspect, the information about the beams may include the radiation angle of each of the beams and the received power value of the receiver corresponding to each of the beams.

That is, the receiving device 110 may receive a received power value corresponding to each of a plurality of beams from a receiver.

As a more specific example, when the number of beams is two, when a transmitter sequentially radiates two beams at a regular interval, the receiving device 110 may sequentially receive received power values corresponding to each of the two beams from a receiver.

Based on information about a plurality of beams, the radiation pattern reader 120 according to one embodiment may read radiation pattern information corresponding to each of the beams.

According to one aspect, the radiation pattern reader 120 may pre-store radiation pattern information corresponding to each of m beams (m being a positive integer) radiated from a transmitter at different radiation angles. In addition, the radiation pattern reader 120 may read radiation pattern information corresponding to information about a plurality of beams among pre-stored radiation pattern information.

That is, at all angles (0° to 360°) with respect a transmitter, the radiation pattern reader 120 may collect radiation pattern information corresponding to each of m beams radiated at different radiation angles and pre-store the radiation pattern information, and may read radiation pattern information corresponding to information about a plurality of beams among the pre-stored radiation pattern information.

That is, the location estimation apparatus 100 according to one embodiment may receive radiation pattern information for all beams formed in each direction from the transmission antenna of a transmitter. Here, the radiation pattern information may be an antenna gain calculated at all angles corresponding to a beam formed at a specific radiation angle.

As a more specific example, when the radiation angle of a beam radiated from a transmitter is 0°, radiation pattern information may include all antenna gain values corresponding to a beam radiated at a radiation angle of 0° within a range of −90° to 90°.

The location estimator 130 according to one embodiment may compare radiation pattern information read by the radiation pattern reader 120, and estimate the location of a receiver based on the comparison results.

According to one aspect, the location estimator 130 may calculate an antenna gain corresponding to each of the read radiation pattern information and subtract decibel (dB) values of calculated antenna gains from each other.

In addition, the location estimator 130 may calculate an angle corresponding to a result value having a preset value among all result values according to subtraction results and estimate an angle corresponding to the calculated result value as an angle between a transmitter and a receiver. For example, the preset value may mean the minimum value among all result values.

More specifically, to locate a receiver, it is necessary to calculate information about the distance (r) between a transmitter and the receiver and the angle (θ) between the transmitter and the receiver. However, when the transmitter transmits only one beam at a certain angle, both the distance (r) and the angle (θ) may not be determined. When another beam is transmitted at a different radiation angle, both the distance (r) and the angle (θ) may be determined.

Equation 1 below shows RSRP values received by a receiver in response to two beams (first and second beams) radiated from a transmitter.

$$\begin{cases} P_{r_1} = \dfrac{P_t \cdot G_1(\theta)}{PL(r)} \\ P_{r_2} = \dfrac{P_t \cdot G_2(\theta)}{PL(r)} \end{cases} \Leftrightarrow \begin{cases} P_{r_1} = P_t - PL(r) + G_1(\theta) \\ P_{r_2} = P_t - PL(r) + G_2(\theta) \end{cases} [dB] \qquad \text{[Equation 1]}$$

Here, $P_{r_1}$ may represent a received power value corresponding to the first beam, $P_{r_2}$ may represent a received power value corresponding to the second beam, $G_1(\theta)$ may represent a decibel (dB) value of an antenna gain of the first beam, $G_2(\theta)$ may represent a decibel (dB) value of an antenna gain of the second beam, PL(r) may represent a path loss value according to a distance (r), and $P_t$ may represent transmission power.

In addition, using the fact that the transmission power ($P_t$) and the path loss value (PL(r)) are the same in Equation 1, Equation 2 below may be derived.

$$P_{r_1} - P_{r_2} = G_1(\theta) - G_2(\theta) \text{ [dB]} \qquad \text{[Equation 2]}$$

That is, since a result value obtained by subtracting ($G_1(\theta)-G_2(\theta)$) decibel (dB) values ($G_1(\theta), G_2(\theta)$) of antenna gains of the first and second beams from each other changes according to the angle (θ), the location estimator 130 may determine an angle (θ) having a specific $G_1(\theta)-G_2(\theta)$ by comparing decibel (dB) values ($G_1(\theta), G_2(\theta)$) of antenna gains.

Here, since the location estimator 130 knows in advance decibel (dB) values ($G_1(\theta), G_2(\theta)$) of antenna gains through the radiation pattern reader 120, the location estimator 130 may calculate an angle (θ) between a transmitter and a receiver satisfying $P_{r_1}-P_{r_2}=G_1(\theta)-G_2(\theta)$ for all angles.

That is, the location estimator 130 according to one embodiment may estimate the location of a receiver by arbitrarily selecting only two beams radiated from a transmitter at different radiation angles.

As a more specific example, the location estimator 130 may calculate decibel (dB) values ($G_1(\theta), G_2(\theta)$) of antenna gains corresponding to each radiation pattern information about first and second beams, subtract ($G_1(\theta)-G_2(\theta)$) the calculated decibel (dB) values ($G_1(\theta), G_2(\theta)$) from each other, and estimate an angle at which the subtraction result is minimum as an angle (θ) between a transmitter and a receiver.

According to one aspect, when a plurality of "result values having a preset value" is calculated according to subtraction (($G_1(\theta)-G_2(\theta)$)) of each of decibel (dB) values of antenna gains corresponding to first and second beams, the location estimator 130 may calculate any one value corresponding to results ($G_1(\theta)-G_3(\theta), G_2(\theta)-G_3(\theta)$) of subtracting a decibel (dB) value ($G_3(\theta)$) of an antenna gain of a third beam from each of decibel (dB) values ($G_1(\theta), G_2(\theta)$) of antenna gains of the first and second beams among calculated result values, and may estimate an angle corresponding to the calculated any one value as an angle (θ) between a transmitter and a receiver.

More specifically, the location estimation apparatus 100 according to one embodiment receives a feedback signal in which a received power value for each of a plurality of beams is reflected from a receiver and estimates the position of the receiver. Due to limitation in the number of bits of the feedback signal (limited feedback), received power may not be accurately determined.

As a more specific example, when received power is fed back with 10 bits, a feedback signal may represent 1,024 ($2^{10}$) received power values. When received power is fed back with only 7 bits, a feedback signal may represent only 128 ($2^7$) received power values.

That is, when resolution for received power values is not sufficient, according to subtraction (($G_1(\theta)-G_2(\theta)$)) of decibel (dB) values of antenna gains of first and second beams, instead of one "result value having a preset value", a plurality of "result values having a preset value" may be calculated.

Accordingly, when a plurality of points having a "result value having a preset value" according to calculation of "$G_1(\theta)-G_2(\theta)$" is calculated, the location estimator 130 according to one embodiment may control a transmitter to radiate a third beam through the controller 140.

In addition, by comparing a plurality of points having a "result value having a preset value" according to calculation of "$G_1(\theta)-G_2(\theta)$" and points calculated through subtraction results (($G_1(\theta)-G_3(\theta), G_2(\theta)-G_3(\theta)$)) using a decibel (dB) value ($G_3(\theta)$) of an antenna gain of a radiated third beam, the location estimator 130 may estimate an angle corresponding to any one point specified through the comparison result as an angle (θ) between a transmitter and a receiver.

In addition, when any one point is not specified even through calculation using a decibel (dB) value ($G_3(\theta)$) of an antenna gain of a third beam, the location estimator 130 may repeat the above-described specific operation using 4th to nth beams until one point is specified.

According to one aspect, based on a value at which a result of subtracting a value obtained by reflecting a decibel (dB) value of an antenna gain corresponding to a first beam to a received power value corresponding to a second beam from a value obtained by reflecting a decibel (dB) value of an antenna gain corresponding to the second beam to a received power value corresponding to the first beam is minimum, the location estimator 130 may estimate an angle between a transmitter and a receiver.

More specifically, in Equation 1, since the transmission power ($P_t$) and the path loss value (PL(r)) are the same, the received power value ($P_{r_1}$) of a first beam and the received power value ($P_{r_2}$) of a second beam may be expressed as in Equation 3 below, and Equation 3 may be expressed as Equation 4.

$$\frac{P_{r_1}}{G_1(\theta)} = \frac{P_{r_2}}{G_{21}(\theta)} = \frac{P_t}{PL(r)} \qquad \text{[Equation 3]}$$

$$\begin{cases} P_{r_1}:P_{r_2} = G_1(\theta):G_2(\theta) \\ P_{r_1} \times G_2(\theta) = P_{r_2} \times G_1(\theta) \\ P_{r_1} \times G_2(\theta) - P_{r_2} \times G_1(\theta) = 0 \end{cases} \qquad \text{[Equation 4]}$$

According to Equation 3, since the received power ratio ($P_{r_1}:P_{r_2}$) and the antenna gain ratio ($G_1(\theta):G_2(\theta)$) measured from two beams (first and second beams) are the same, the location estimator 130 according to one embodiment may find an antenna gain that satisfies this.

That is, the location estimator 130 may estimate an angle (θ) using Equation 5 below derived from Equation 4.

$$\hat{\theta}_{estimate} = \arg\min_{\theta} \{|P_{r_1} \times G_2(\theta) - P_{r_2} \times G_1(\theta)|\} \qquad \text{[Equation 5]}$$

In addition, a radiation pattern calculator 120 may calculate two beams having the largest received power value among a plurality of beams, and may calculate radiation pattern information corresponding to each of the two calculated beams.

That is, a receiving device 110 may receive received power values corresponding to each of n beams (n being a positive integer) radiated at different radiation angles through beamforming from a transmitter, and the radiation pattern calculator 120 may calculate two beams having the largest received power value among received power values corresponding to each of a plurality of beams.

More specifically, when two or more beams are radiated from a transmitter, the amount of computation increases when all angles are taken into account, so that the location of a receiver may be estimated by selecting two beams having a large received power value.

In addition, in a method of estimating a location using any two beams, when a receiver is located at a very low side lobe or null point, the accuracy of location estimation may be somewhat deteriorated due to a very small antenna gain. However, a method of estimating a location using two beams selected according to a received power value may solve this problem.

According to one aspect, when the radiation angles of two beams having the largest received power value are $\theta_1$ and $\theta_2$ ($\theta_1 < \theta_2$), respectively, the location estimator 130 may estimate the location of a receiver within a radiation angle range of $\theta_1 - \alpha$ to $\theta_2 + \alpha$ ($\alpha$ being an interval between calculated two beams).

That is, the location estimator 130 may limit an angle ($\theta$) search range when estimating the location of a receiver.

More specifically, when the transmission angles of two beams having large received power values reported from a receiver are $\theta_1$ and $\theta_2$, since the receiver is likely to be located in a range of $\theta_1 - \alpha$ to $\theta_2 + \alpha$, it may not be appropriate to consider all angles.

Here, when $\alpha$ is set to an interval (angle) between two beams corresponding to $\theta_1$ and $\theta_2$, when a receiver is out of a range of $\theta_1 - \alpha$ to $\theta_2 + \alpha$, this is because a power value received by a beam radiated at other angle other than beams radiated at $\theta_1$ and $\theta_2$ is larger.

Summarizing the above description, Equation 5 may be summarized as Equation 6 below.

$$\text{for } \theta \text{ in range } [\theta_1 - \alpha, \theta_2 + \alpha]$$
$$\hat{\theta}_{estimate} = \underset{\theta}{\operatorname{argmin}}\{|P_{r_1} \times G_2(\theta) - P_{r_2} \times G_1(\theta)|\} \quad \text{[Equation 6]}$$

In a method of estimating a location using two beams selected according to received power values, since the selected two beams have greater received power than other beams, it may be determined that it is impossible for a receiver to be located at an angle at which an antenna gain value is very small, such as a side lobe or a null point. Similarly, when a receiver is located at a location outside of $\theta_1 - \alpha$ to $\theta_2 + \alpha$, since received power may not be the greatest, it may be determined that it is impossible for the receiver to be located at that position.

Figure 2:
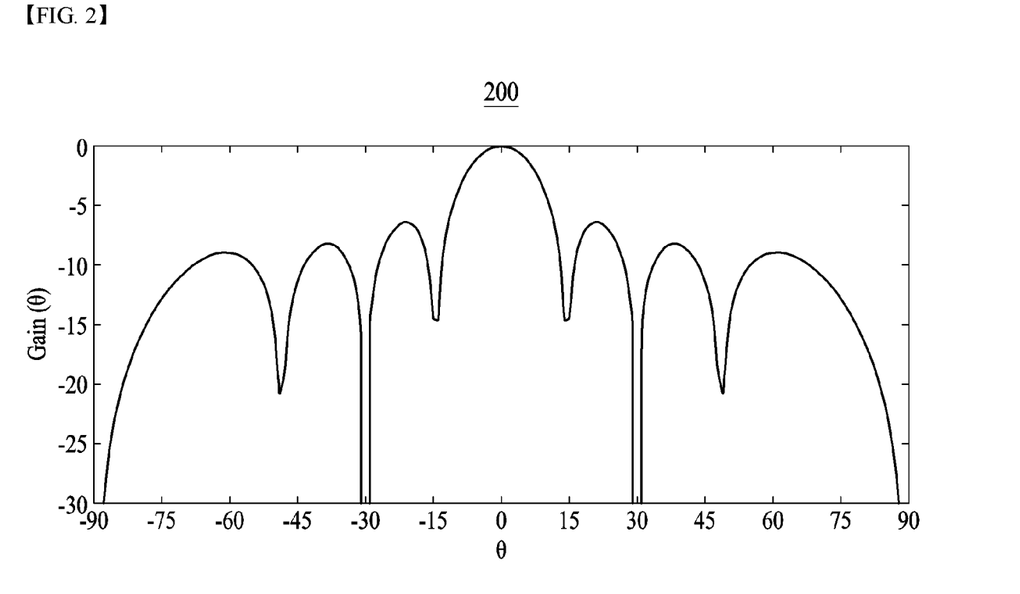
FIG. 2 is a diagram for explaining an example of radiation pattern information described through a location estimation apparatus according to one embodiment.

FIG. 2 is a diagram for explaining an example of radiation pattern information described through a location estimation apparatus according to one embodiment.

Referring to FIG. 2, reference numeral 200 denotes radiation pattern information of a beam radiated from a transmitter at a radiation angle of 0°.

Referring to reference numeral 200, it can be seen that the radiation pattern information includes information about an antenna gain (Gain ($\theta$)) calculated at all angles corresponding to a beam formed when a beam is formed at a specific radiation angle.

That is, the radiation pattern information of a beam radiated at a radiation angle of 0° may include all antenna gain (Gain ($\theta$)) values according to radiation patterns within a range of −90° to 90°.

Figure 3A:
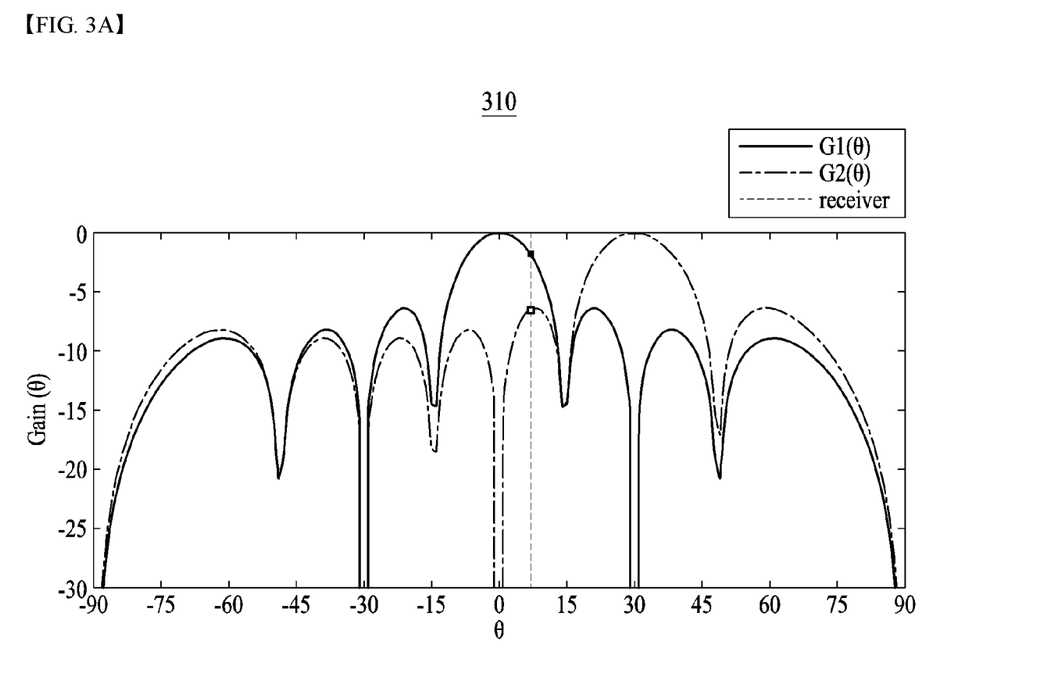
FIGS. 3A and 3B are diagrams for explaining an example of estimating the location of a receiver using a location estimation apparatus according to one embodiment.
Figure 3B:
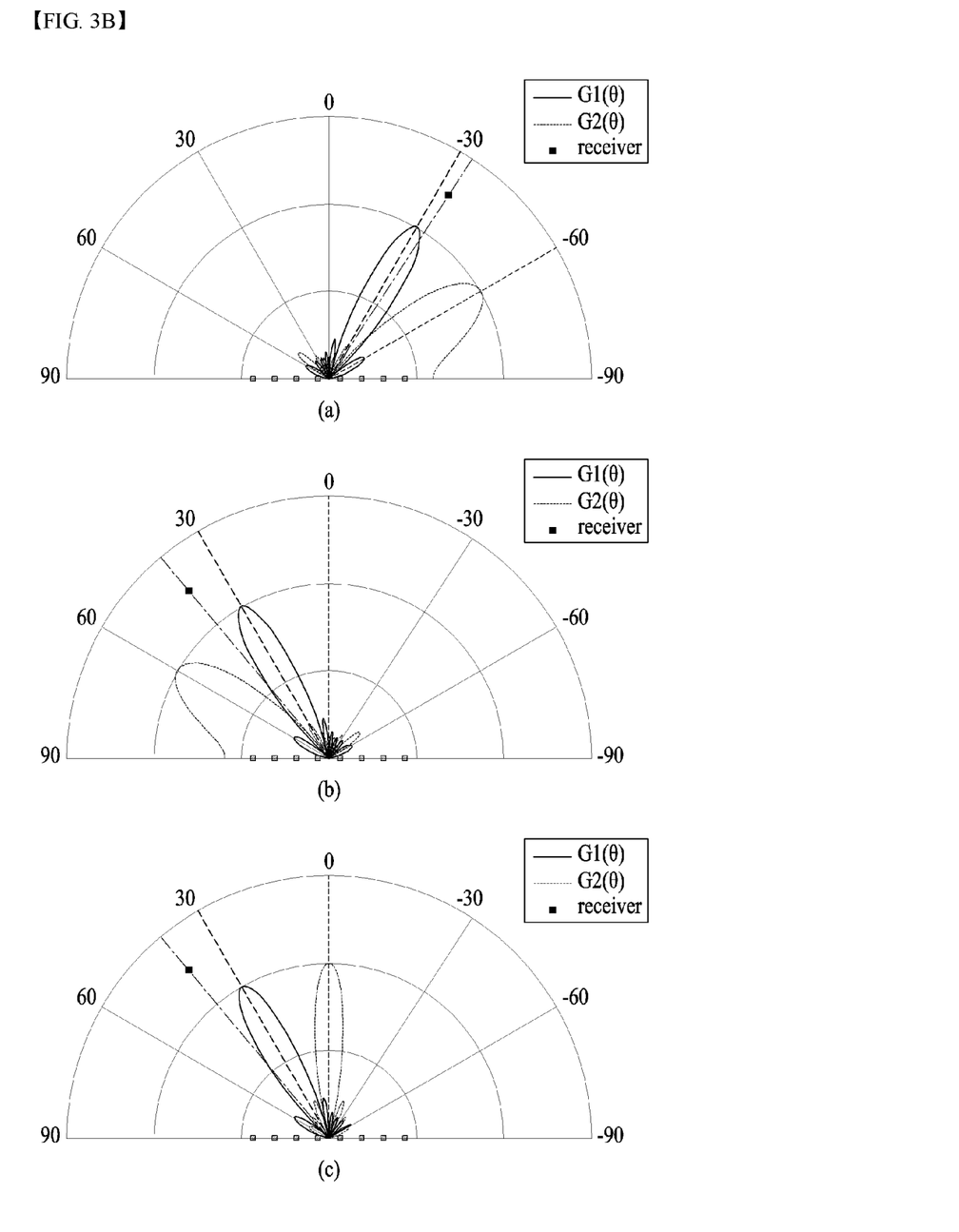

FIGS. 3A and 3B are diagrams for explaining an example of estimating the location of a receiver using a location estimation apparatus according to one embodiment.

Referring to FIGS. 3A and 3B, reference numeral 310 denotes an example of estimating a location of a receiver using two beams selected according to received power values in the location estimation apparatus according to one embodiment, and FIG. 3B denotes an example of estimating the location of a receiver using two arbitrary beams in the location estimation apparatus according to one embodiment.

Referring to reference numeral 310, the location estimation apparatus according to one embodiment may estimate the location of a receiver using two beam having the largest received power value among n beams (n being a positive integer) radiated at different radiation angles through beamforming from a transmitter.

More specifically, when a transmitter radiates beams with radiation angles of −60°, −30°, 0°, 30°, and 60° in predefined directions, the location estimation apparatus according to one embodiment may receive a received power value corresponding to each of a plurality of beams radiated in a predefined direction from a receiver.

Next, the location estimation apparatus according to one embodiment may determine that a received power value is the largest when a beam is radiated at radiation angles of 0° and 30° through a received power value received from a receiver.

That is, according to the embodiment of reference numeral 310, the two largest values of received power for beams of five radiation angles are values for beams with radiation angles of 0° and 30°, and are −22.3494 dBm and −24.9516 dBm, respectively.

Next, the location estimation apparatus according to one embodiment may perform subtract calculation ($G_1(\theta) - G_2(\theta)$) of decibel (dB) values of antenna gains corresponding to beams radiated at radiation angles of 0° and 30° within a range of −30° to 30°, and may estimate that a receiver is located at 10° corresponding to a point having the smallest subtraction result value.

More specifically, according to the radiation pattern of reference numeral 310, the difference between the antenna gain (−4.2026 dB) when $\theta = 10°$ at a 0° beam and the antenna gain (−6.8048 dB) when $\theta = 10°$ at a 30° beam is the closest to the difference in received power values (2.6022 (=−22.3494−24.9516)).

As another embodiment, according to the case in which a receiver is located at −33° as in (a) of FIG. 3B, the location estimation apparatus according to one embodiment may estimate the location of a receiver using two beams radiated from a transmitter at arbitrary radiation angles of −30° and −60°.

More specifically, the location estimation apparatus according to one embodiment may perform subtract calculation ($G_1(\theta) - G_2(\theta)$) of decibel (dB) values of antenna gains corresponding to two beams radiated at radiation angles of −30° and −60°, and may estimate that a receiver is located at −33° corresponding to a point having the smallest subtraction result value.

In addition, referring to (b) to (c) of FIG. 3B, using two beams radiated at radiation angles of 30° and 60° and two beams radiated at radiation angles of 30° and 0°, the location estimation apparatus according to one embodiment may estimate that receivers are located at 35° and 40°, respectively.

FIGS. 4A to 4D are diagrams for explaining the location estimation performance of a location estimation apparatus according to one embodiment.

Referring to FIGS. 4A to 4D, reference numeral 410 shows error measurement results of location estimation according to beam intervals using each of "a method (Basic) of transmitting a beam at an angle where the largest RSRP is measured" and "a method (Weighted combining) using a weighting factor", which are conventional location estimation methods, and "a method (Proposed) of estimating a location using the location estimation apparatus according to one embodiment".

Figure 4A:
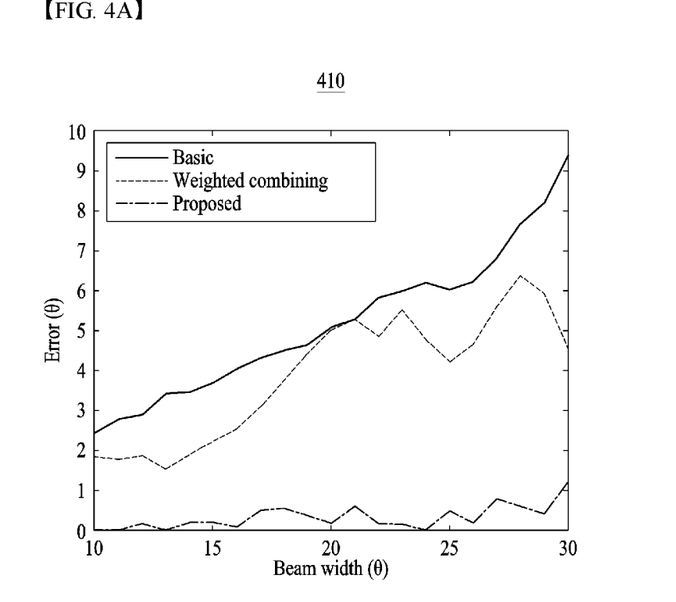
FIGS. 4A to 4D are diagrams for explaining the location estimation performance of a location estimation apparatus according to one embodiment.
Figure 4B:
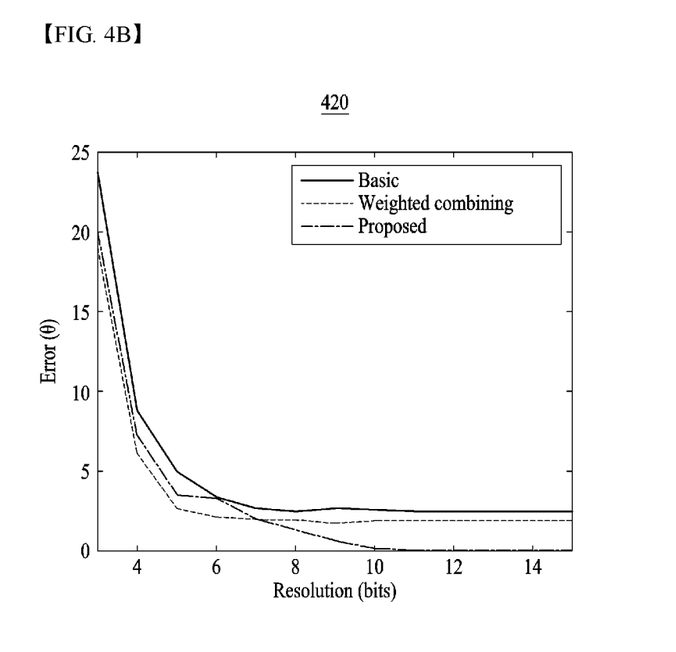

In addition, reference numeral 420 denotes an error measurement result according to change in bit resolution using the three methods described above.

Figure 4C:
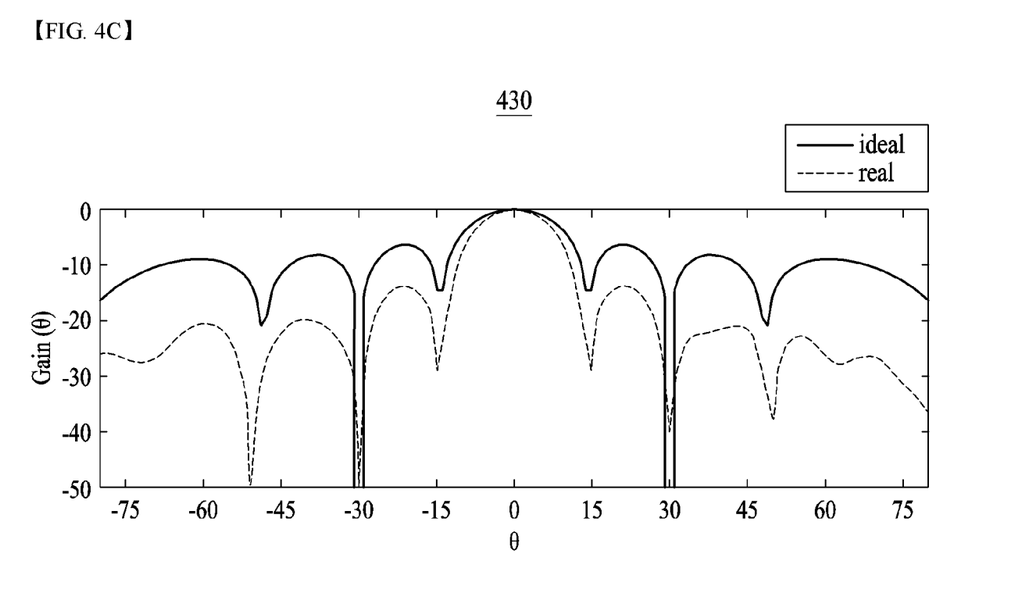
Figure 4D:
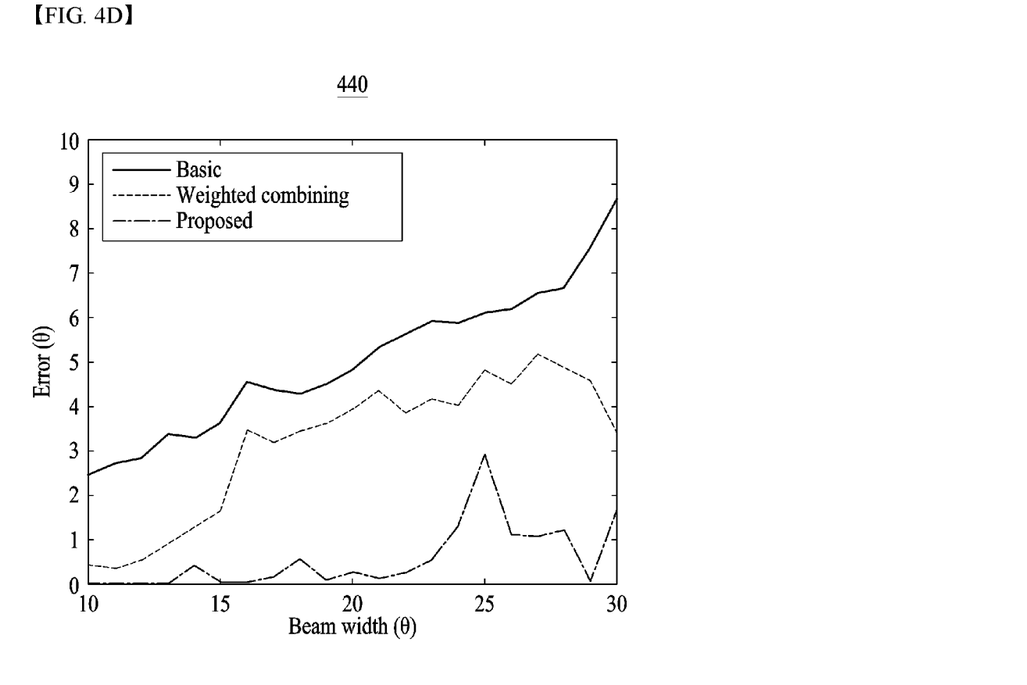

In addition, reference numeral 430 denotes an actual beam pattern of a 5.6 GHz 8×8 antenna, and reference numeral 440 denotes a result of estimating the location of a receiver by applying the actual beam pattern of reference numeral 430 to the above three methods.

In reference numeral 410, each method was evaluated using performance according to an interval between beams and the number of bits used when reporting RSRP.

Here, the reason for considering an interval between beams is that an error for location estimation is reduced when a beam interval is narrow, but it takes a long time and complexity increases because the number of beams to be transmitted increases.

On the other hand, when a beam interval is wide, time and complexity may be reduced, but a large error may occur because the probability that a receiver is located at a side lobe or a null point increases. In addition, the reason for considering the number of bits is that since the number of bits used when a receiver feeds back an RSRP value is limited, a correct value may not be transmitted. To confirm the robustness of an algorithm against errors caused by this reason, two evaluation criteria were selected, and the results were reviewed.

Referring to reference numeral 410, as a result of examining angle estimation errors according to the three methods described above while increasing an interval (angle) between beams for location estimation, it can be seen that the proposed method (Proposed) has a smaller error than the conventional methods (Basic, Weighted combining).

Referring to reference numerals 420 to 440, as a result of examining an angle estimation error according to the number of bits used when reporting RSRP, in a simulation, RSRP transmission was assumed to be performed by quantizing a value between −5 dB and −140 dB according to the number of bits.

Specifically, in the case of more than 5 bits, the conventional method (Weighted combining) showed better performance than the proposed method (Proposed). However, in the case of more than 7 bits, the proposed method (Proposed) showed better performance than the conventional methods (Basic, Weighted combining) as the number of bits increased.

In addition, in the proposed method (Proposed), a position may be estimated by a transmitter to which a receiver is connected without communication with multiple transmitters.

Accordingly, a location may be estimated more accurately than the conventional methods while reducing the complexity of an overall system. In addition, even in a situation where distortion occurs through simulation, a location may be estimated with a lower error compared to other algorithms.

In addition, as a result of applying the proposed method (Proposed), the location of a receiver may be estimated even in a simulation in which the actual beamforming pattern of a 5.6 GHz 8×8 antenna is applied by changing a beam pattern. That is, the proposed method (Proposed) may be easily applied even when beam patterns according to the number of antennas or frequencies are different.

Figure 5:
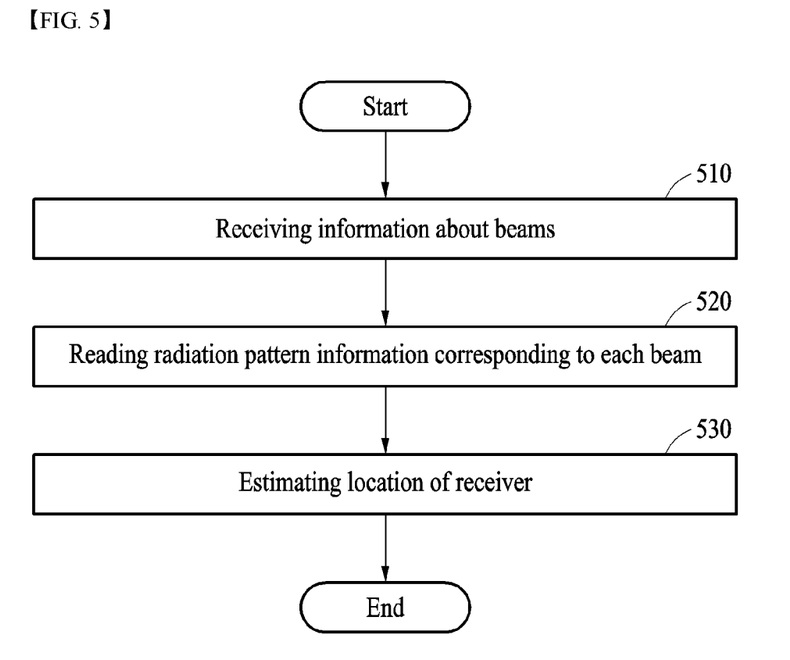
FIG. 5 is a flowchart for explaining a location estimation method according to one embodiment.

FIG. 5 is a flowchart for explaining a location estimation method according to one embodiment.

That is, FIG. 5 is a flowchart for explaining a location estimation method using the location estimation apparatus according to one embodiment described with reference to FIGS. 1 to 4D. Hereinafter, among descriptions described with reference to FIG. 5, descriptions that overlap with those described in the location estimation apparatus according to one embodiment will be omitted.

Referring to FIG. 5, according to the location estimation method according to one embodiment, in step 510, a receiving device may receive information about a plurality of beams radiated from a transmitter at different radiation angles.

According to one aspect, the information about the beams may include the radiation angle of each of the beams and the received power value of the receiver corresponding to each of the beams.

Next, according to the location estimation method according to one embodiment, in step 520, a radiation pattern reader may read radiation pattern information corresponding to each of the beams based on information about the beams.

Next, according to the location estimation method according to one embodiment, in step 530, a location estimator may compare the read radiation pattern information with each other and estimate the location of a receiver based on the comparison results.

According to one aspect, according to the location estimation method according to one embodiment, in step 530, a decibel (dB) value of an antenna gain corresponding to each of the read radiation pattern information may be calculated, the calculated decibel (dB) values of antenna gains may be subtracted from each other, an angle corresponding to a result value having a preset value among all result values according to subtraction results may be calculated, and an angle corresponding to the calculated result value may be estimated as an angle between a transmitter and a receiver.

According to one aspect, according to of the location estimation method according to one embodiment, in step 530, two beams having the largest received power value among a plurality of beams may be calculated, and radiation pattern information corresponding to each of the calculated two beams may be calculated.

When the present invention is used, by comparing radiation pattern information corresponding to a plurality of beams radiated from a transmitter at different arbitrary radiation angles, the location of a receiver may be estimated.

In addition, by using only two beams radiated from a transmitter at different arbitrary radiation angles, the location of a receiver may be accurately estimated.

In addition, by estimating the location of a receiver in all directions based on the location of a transmitter by transmitting only two beams and comparing received values for the two beams, complexity of location estimation may be reduced, and location estimation may be performed quickly.

Although the present invention has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

The invention claimed is:

1. A location estimation apparatus, comprising:
a receiving device for receiving information about a plurality of beams radiated from a transmitter at different radiation angles;
a radiation pattern reader for reading radiation pattern information corresponding to each of the beams based on information about the beams; and
a location estimator for comparing the read radiation pattern information with each other and estimating a location of a receiver based on the comparison result,
wherein the location estimator calculates an antenna gain corresponding to each of the read radiation pattern information, subtracts each of decibel (dB) values of the calculated antenna gains from each other, calculates an angle corresponding to a result value having a preset value among all result values according to the subtraction results, and estimates an angle corresponding to the calculated result value as an angle between the transmitter and the receiver.

2. The location estimation apparatus according to claim 1, wherein the information about the beams comprises a radiation angle of each of the beams and a received power value of the receiver corresponding to each of the beams.

3. The location estimation apparatus according to claim 1, wherein the radiation pattern reader pre-stores radiation pattern information corresponding to each of m beams (m being a positive integer) radiated from the transmitter at different radiation angles and reads radiation pattern information corresponding to information about the beams among the pre-stored radiation pattern information.

4. The location estimation apparatus according to claim 1, wherein, when a plurality of result values having the preset value is calculated according to subtraction of each of decibel (dB) values of antenna gains corresponding to first and second beams, the location estimator calculates any one value corresponding to each subtraction result between decibel (dB) values of antenna gains of the first and second beams and a decibel (dB) value of an antenna gain of a third beam among the calculated result values and estimates an angle corresponding to the calculated value as an angle between the transmitter and the receiver.

5. The location estimation apparatus according to claim 2, wherein the location estimator estimates an angle between the transmitter and the receiver based on a value at which a result of subtracting a value obtained by reflecting a decibel value of an antenna gain corresponding to a first beam to a received power value corresponding to a second beam from a value obtained by reflecting a decibel value of an antenna gain corresponding to the second beam to a received power value corresponding to the first beam is minimum.

6. The location estimation apparatus according to claim 2, wherein the radiation pattern reader calculates two beams having the largest received power value among the beams and reads radiation pattern information corresponding to each of the calculated two beams.

7. The location estimation apparatus according to claim 6, wherein, when radiation angles of the calculated two beams are $\theta_1$ and $\theta_2$ ($\theta_1 < \theta_2$), respectively, the location estimator estimates a location of the receiver within a radiation angle range of $\theta_1 - \alpha$ to $\theta_2 + 60$ ($\alpha$ being an interval between the calculated two beams).

8. A location estimation method, comprising:
a step of receiving, by a receiving device, information about a plurality of beams radiated from a transmitter at different radiation angles;
a step of reading, by a radiation pattern reader, radiation pattern information corresponding to each of the beams based on information about the beams; and
a step of comparing, by a location estimator, the read radiation pattern information with each other and estimating a location of a receiver based on the comparison result,
wherein, in the step of estimating a location of a receiver, an antenna gain corresponding to each of the read radiation pattern information is calculated, each of decibel (dB) values of the calculated antenna gains is subtracted from each other, an angle corresponding to a result value having a preset value among all result values according to the subtraction results is calculated, and an angle corresponding to the calculated result value is estimated as an angle between the transmitter and the receiver.

9. The location estimation method according to claim 8, wherein the information about the beams comprises a radiation angle of each of the beams and a received power value of the receiver corresponding to each of the beams.

10. The location estimation method according to claim 9, wherein, in the step of reading radiation pattern information, two beams having the largest received power value among the beams are calculated, and radiation pattern information corresponding to each of the calculated two beams is read.

* * * * *